Nov. 20, 1956   C. J. HIMEL   2,770,911
ANT AND INSECT TRAPS
Filed Sept. 8, 1954
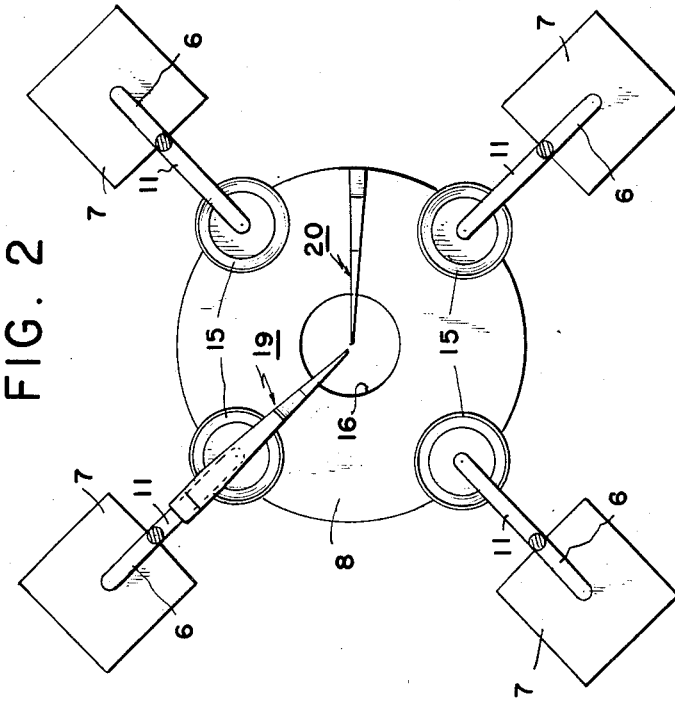
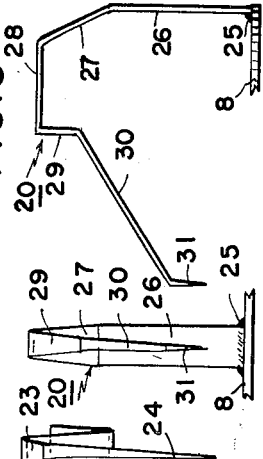
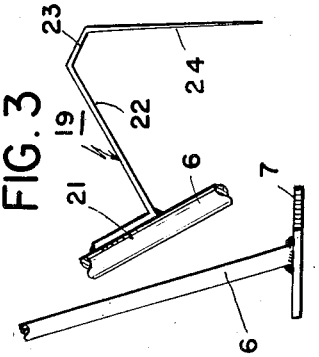
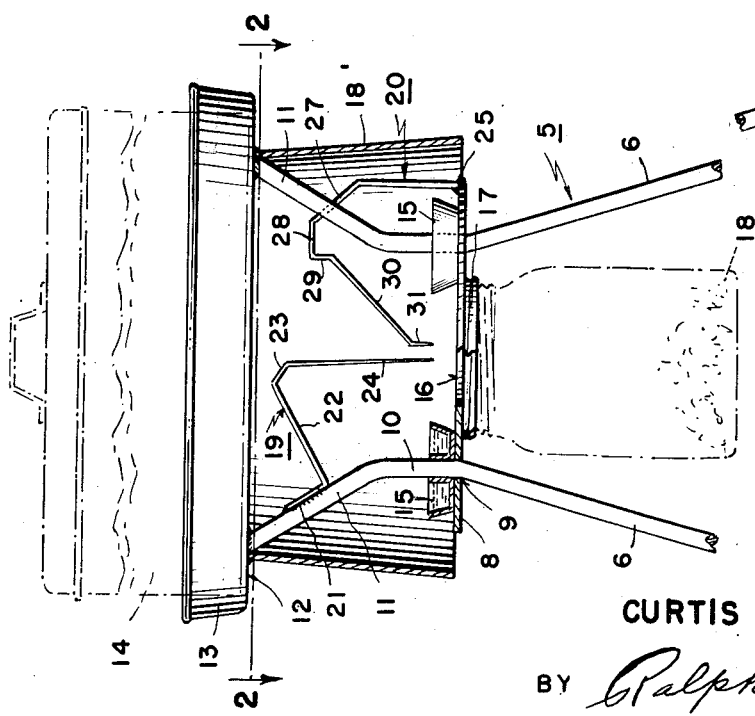
INVENTOR
CURTIS J. HIMEL
BY
ATTORNEY

United States Patent Office 2,770,911
Patented Nov. 20, 1956

2,770,911

ANT AND INSECT TRAPS

Curtis Joseph Himel, Belle Chasse, La.

Application September 8, 1954, Serial No. 454,780

4 Claims. (Cl. 43—121)

This invention relates to Ant and Insect Traps and has for its object to provide a stand for supporting a bait receptacle in elevated relation to the ground having a runway incorporated in the construction of the stand to provide a single path of travel for the ants to and from the bait with a gap in the runway above a poison receptacle to cause the ants to drop from the runway and fall into the poison.

A further object of the invention resides in providing a runway formed of a pair of members fixedly attached at one end to the stand and having their opposite ends disposed perpendicular to the top of the poison receptacle and in spaced apart parallel relation.

A still further object of the invention resides in providing a stand having a tray at its upper end for supporting a bait receptacle, a plate beneath the tray for supporting a detachable poison receptacle and an interrupted runway between the tray and plate.

Another object of the invention resides in providing a trap which is simple and durable in construction, reliable and efficient in performing its function and inexpensive to manufacture.

Other objects and advantages of the invention will be apparent during the course of the following specification.

In the accompanying drawing, forming a part of this specification and in which like numerals are employed to designate like parts throughout the same:

Fig. 1 is a fragmentary side elevational view of the trap, partly in section,

Fig. 2 is a cross sectional view taken on line 2—2 of Fig. 1,

Fig. 3 is a side view of one of the members forming the runway,

Fig. 4 is a front view of the member shown in Fig. 3,

Fig. 5 is a front view of the other member forming the runway, and,

Fig. 6 is a side view of the member shown in Fig. 5.

The invention disclosed herein is an improvement on the trap disclosed in my prior Patent No. 2,168,339 issued August 8, 1939.

Referring to the drawing wherein for the purpose of illustration a preferred embodiment of the invention is shown the stand 5 comprises a plurality of legs 6, formed of metal or other suitable material, arranged equi-distance apart. The legs 6 extend downwardly in diverging relation and have base plates 7 attached to their lower ends for supporting the stand in an upright position. A circular plate 8 is mounted on the legs intermediate their ends and is provided with apertures 9 adjacent its marginal edge through which the legs extend. The legs above the plate 8 are bent to extend vertically, as at 10, and then are bent outwardly, as at 11, with a tray 12 supported on their upper ends. The tray 12 is provided with an upstanding marginal flange 13 and supports a bait receptacle such as a garbage can 14. Grease cups 15 surround each of the legs 6 above the plate 8 and the center of the plate is provided with an opening 16 having a depending screw threaded flange 17 to receive the screw threaded neck of a detachable poison receptacle 18, such as a glass jar. A depending skirt 18' surrounds the upper portions of the legs 6 between the tray 12 and plate 8 which protects the grease cups from the weather.

A runway between the plate 8 and upper portion of one of the legs is formed by a pair of members 19 and 20 constructed of narrow strips of metal or other suitable material, tapering in width towards one end. The member 19 has its wide end attached, as at 21, to the upper portion of one leg 6, by welding or other suitable means and is bent to extend in an upward inclined direction, as at 22, then in a downwardly inclined direction, as at 23 and then downwardly in a perpendicular direction, as at 24, with its free end terminating above the approximate center of the opening 16 of plate 8. The member 20 has its wide end attached, as at 25, to the marginal edge of plate 8 opposite the member 19 and between a pair of the legs 6. The member 20 extends vertically, as at 26, then is bent inwardly to extend in an upwardly inclined direction, as at 27, then horizontally, as at 28, then downwardly in a vertical direction, as at 29, then in a downwardly inclined direction, as at 30 and then downwardly in a perpendicular direction, as at 31, with its free end disposed opposite and in spaced parallel relation to the free end of member 19, thus forming a gap between the free ends of members 19 and 20 to interrupt the runway formed by the members.

In operation the ants or insects travel up the legs 6 of the stand and upon reaching the plate 8 are prevented from traveling up the upper portions of the legs by the grease cups 15. In order to reach the bait receptacle 14 supported by the tray 12 the ants must travel along the runway formed by members 19 and 20. As the ants travel towards the bait they crawl along the member 20 until they reach the gap formed between the free ends of members 19 and 20. Some of the ants will be successful in bridging the gap while others will fall off the runway and drop into the poison receptacle 18. The ants that are successful in bridging the gap continue along the member 19 and are able to reach the bait receptacle. The ants that reach the bait can only return over the single runway and as they travel along the member 19 they meet other ants traveling in the opposite direction towards the bait. The two streams of ants traveling along the runway towards and from the bait upon reaching the gap form clusters of ants which by their own weight causes a large proportion of the ants to fall from the runway into the poison receptacle 18.

It is to be understood that the form of my invention herein shown and described is a preferred example of the same and changes in the shape, size and arrangement of the parts may be made without departing from the spirit of the invention or scope of the claims.

Having thus described my invention, I claim:

1. A trap of the character described comprising an upright stand composed of a plurality of legs having portions disposed in diverging relation, a plate connecting said legs in spaced relation having a central opening, a tray adapted to support a bait receptacle mounted on the upper ends of said legs in vertical spaced relation to said plate, a cup adapted to hold grease surrounding each of said legs above said plate, a receptacle adapted to hold poison depending from said plate beneath the central opening, and a runway extending between said plate and one of said legs composed of a pair of narrow strips, each of said strips having a pointed end portion disposed in perpendicular relation to said plate above the central opening, the pointed end portions being spaced apart in parallel relation to provide a gap in the runway.

2. A trap of the character described comprising an upright stand composed of a plurality of legs disposed in spaced relation, a plate connecting said legs having a central opening, said opening having a depending screw-threaded flange receptacle connected to said flange and adapted to hold poison, a bait tray mounted on the upper ends of said legs, a cup adapted to hold grease surrounding each of said legs above said plate, a runway composed of a pair of tapered strips, one of said strips being attached to one of the legs above the grease cup and the other strip being attached to said plate, said strips being angularly bent with their tapered ends disposed in spaced parallel relation perpendicular to said plate and above the opening of said plate.

3. A trap of the character described comprising an upright stand composed of legs and a tray adapted to hold a bait receptacle rigidly secured to the top end of said legs, a plate mounted beneath said tray in spaced relation thereto having a central opening, a receptacle adapted to hold poison suspended from said plate beneath said opening, and a runway between said plate and said tray composed of a pair of tapered strips having their tapered ends disposed in spaced parallel relation perpendicular to the opening of said plate to provide a gap in the runway directly over the central opening of said plate.

4. A trap of the character described comprising an upright stand composed of a plurality of legs, a tray supported at the upper end of said legs and adapted to hold a bait receptacle, a plate beneath said tray holding said legs in spaced relation, said plate having a central opening, a receptacle adapted to hold poison suspended from the wall of the opening of said plate, a runway composed of a pair of strips, one of said strips being attached to one of the legs of said stand adjacent the bottom of said tray and the other strip being attached to the marginal edge of said plate, said strips being angularly bent in a direction towards each other with their free ends tapered to a point and disposed in spaced parallel relation perpendicular to said plate to provide a gap in the runway above the opening of said plate, and a skirt depending from the bottom of said tray and surrounding the marginal edge of said plate in spaced relation thereto.

References Cited in the file of this patent

UNITED STATES PATENTS

| | | |
|---|---|---|
| 115,215 | Keep | May 23, 1871 |
| 1,126,216 | Holman | Jan. 26, 1915 |
| 1,128,946 | Blum | Feb. 16, 1915 |
| 1,549,414 | Gregorie | Aug. 11, 1925 |
| 2,168,339 | Himel | Aug. 8, 1939 |
| 2,193,492 | Richardson | Mar. 12, 1940 |
| 2,545,772 | Fisher | Mar. 20, 1951 |